United States Patent [19]

Paquette

[11] 4,159,953

[45] Jul. 3, 1979

[54] SLIDE PLATE FILTERS FOR THERMOPLASTIC AND SIMILAR MATERIALS

[75] Inventor: James P. Paquette, Uxbridge, Mass.

[73] Assignee: The Berlyn Corporation, Worcester, Mass.

[21] Appl. No.: 912,538

[22] Filed: Jun. 5, 1978

[51] Int. Cl.² ............................................. B01D 35/16
[52] U.S. Cl. ..................................... 210/396; 210/408
[58] Field of Search .................... 210/65, 66, 79, 106, 210/107, 158, 159, 324, 329, 332, 334, 391, 396, 397, 407, 408, 184, 173, 97, 109; 425/184, 185, 218, 232, 308, 199; 15/256.5

[56] References Cited

U.S. PATENT DOCUMENTS 3,856,680  12/1974  Elmore ................................. 210/184

Primary Examiner—Frank Sever
Attorney, Agent, or Firm—Alfred H. Rosen

[57] ABSTRACT

A slide filter device for filtering thermoplastic and other materials which become fluid or stiffen in response to temperature change, having rigid self-supporting slide plate means movable within a housing from an inlet port passageway to an outlet port passageway for supporting and carrying replaceable filter media across the path of fluid flow (i.e.: the "melt stream") of the working material. The outlet port passageway is larger in cross-section than the slide plate means and a seal of stiffened working material is formed in the gap between the slide plate means and the walls of the passageway. Seal material emerges from the outlet port passageway affixed to the slide plate means as the slide plate means is advanced across the melt stream. Stripper knife means provided with or without temperature control means is fixed adjacent the outlet port passageway for removing seal material with used filter media from the up-stream face of the slide plate means and, if desired, for applying braking force to the advancing slide plate means. The slide plate means is in separate successive sections, and braking force can be applied to the emerging slide plate section so as to prevent the parting of adjacent successive slide plate sections while their confronting boundaries are within the path of material flow.

14 Claims, 7 Drawing Figures

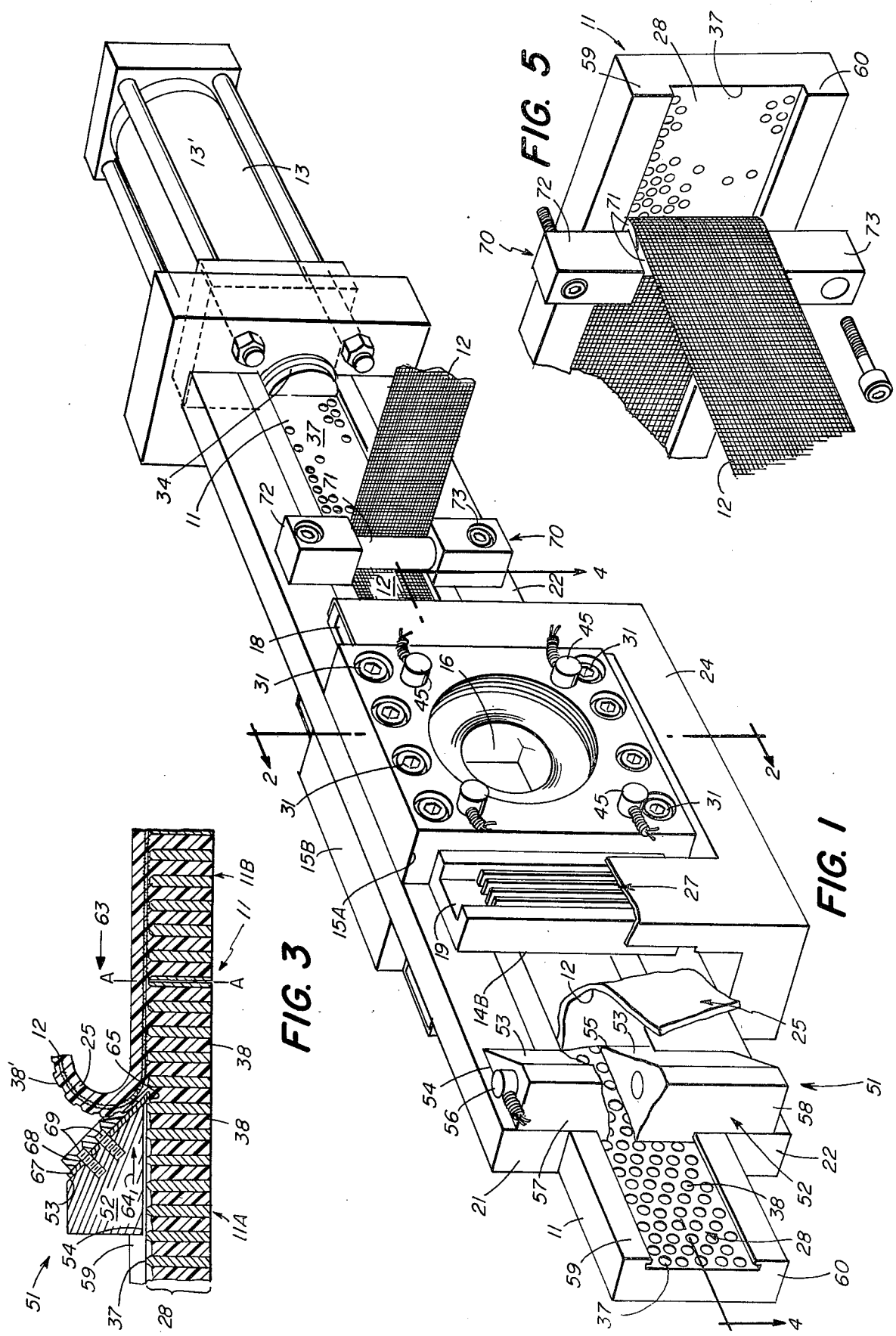

SLIDE PLATE FILTERS FOR THERMOPLASTIC AND SIMILAR MATERIALS

BACKGROUND OF THE INVENTION

In the manufacture of articles from rubbery, visco-elastic and thermoplastic working materials (e.g.: polymers, and certain thermosetting resins, vulcanizable materials and polymerzable monomers) all of which are sometimes called plastic stock, it is common practice to filter the working materials. This may be done, for example, in a reclaiming process, to prepare re-claimed materials for use in a product; it may also be done, for example, in an extrusion apparatus, to make certain that no foreign matter will be introduced into an extrusion die.

An extrusion process is a continuous process in which the quality and quantity of the extrudate are proportional to the stability and consistency of the melt. A change in operating conditions changes the quality or quantity or both of the end product, and some of the conditions which can change are affected by conventional filtering operations. The practice of filtering the working material in an extrusion process requires the positioning of a filter medium across the path of material flow resulting in a pressure drop. The size of the pressure drop is related to the difficulty with which working material passes through the filter medium. When the filter medium is clean the pressure drop across the medium is low as compared to the pressure drop which exists when the filter medium is clogged with collected contaminants. For example, a 1500 psi drop is typical for a clean filter, whereas a pressure drop of 4000 psi is typical for a clogged filter medium.

It is desirable to have a constant and preferably low pressure drop across the filter medium for reasons relating to the quality and quantity of the working material. When the pressure drop across the filter medium increases, the shear on the working material increases, which in turn increases the temperature of the working material. The temperature of the working material is a basic operating parameter which determines a particular quality of the material. In addition, an increase in pressure drop across the filter medium reduces the rate of production of the entire line as well as requiring additional extruder pump horsepower to overcome the rising back pressure. Of course, an increase in cost also results.

The need to minimize transients in operating conditions caused by the collection of contaminants on the filter medium has been recognized for more than 75 years. A rigid slide plate filter, not unlike filters in use today, is shown in U.S. Pat. No. 642,814 issued to Cowen in 1900. It has two filters on one slide plate, and when one of the filters becomes clogged the slide plate is moved to remove the first filter entirely and replace it with the second filter, bringing about an immediate dramatic change in operating pressure. Other forms of rigid slide plate filter like Cowen's are shown in Garrahan's U.S. Pat. No. 1,195,576; Voight U.S. Pat. No. 3,684,419; Paquette U.S. Pat. No. 3,797,655; Cooper et al U.S. Pat. No. 3,804,758; and Heston U.S. Pat. No. 3,983,038.

It is common practice to use slide plate filters in a process where the working material is highly pressurized, sometimes as high as 10,000 pounds per square inch or more. There is, therefore, a need to seal the slide filter apparatus against leakage of working material from the melt stream along surfaces of the slide plate. On the other hand, there is a need to move the filter medium across the melt stream at such a rate that a low, constant pressure drop is present, and if the sealing means used presents high friction between the slide plate and the filter housing, then the ability to move the filter medium across the path of working material flow (i.e.: the "melt stream") is made more difficult. Filters that are useable at such high operating pressures with sealing means that can be maintained continuously at the inlet port passageway and at the outlet port passageway while permitting the screen plate means carrying filter media to be moved continuously across the melt stream are described and claimed in copending applications of the present inventor and another, Ser. No. 712,962, filed Aug. 9, 1976; and Ser. No. 801,748, filed May 31, 1977.

In filters of the type described in the copending applications, a rigid self-supporting filter plate carries filter media across the melt stream from an inlet port passageway to an outlet port passageway, at least the outlet port passageway being larger in cross-section than the filter plate, and a seal of stiffened working material is formed in the gap between the filter plate and the walls of the passageway. The seal material, including on the up-stream face of the filter plate used filter media and contaminants filtered from the melt stream, emerges from the outlet port passageway with the filter plate as the latter is advanced across the melt stream. Typical practice in such filters is to use sections of filter plate means in succession, one following the other across the melt stream, and as each section emerges from the outlet port passageway to treat it as by heating to remove the hardened seal material and spent filter media and contaminants in order to prepare the filter plate section for re-use. This practice is time-consuming, and it adds cost to the filter process.

GENERAL NATURE OF THE INVENTION

The present invention provides means to remove from the up-stream side of each filter plate section, as it emerges from the outlet port passageway, hardened seal material together with used filter media and contaminants filtered from the melt stream. According to a preferred embodiment of the invention, a knife mechanism is fixed adjacent the outer end of the outlet port passageway, in posotion to strip the seal material and used filter media off the upstream face of emerging filter plate sections. This knife can be fitted with heating or cooling means. Application of heat will facilitate stripping of a thermoplastic material from the filter plate sections. In addition, the knife mechanism can be made to function as a combination stripper and brake so as to apply a force cooperating with the force applied to advance the filter plate means across the melt stream to hold the filter plate sections together while resident in the melt stream. Braking force can be modulated by adjusting the temperature of the stripper knife. Interlock mechanisms heretofore used for holding successive filter plate sections together in filters of the type described can thereby be eliminated.

Filter plate sections useful in the present invention are of simple design. The cross-section is uniform from one end to the other, and no interlock means are required between successive sections, so that the cost of manufacturing the filter plate sections is reduced, in some cases 50% or more. The breaker portion of each filter plate section containing holes for the passage of filtered working material in the melt stream will not be stripped entirely by the stripper knife mechanism and hardened seal material will remain in those holes after the upstream face of each section has been stripped of used screen media, contaminants and seal material. However, seal material deposits in the breaker portion holes after passing through the filter media and is therefore clean, and it cannot degrade because it is cold before being exposed to ambient air, so that upon being reintroduced into the melt stream when a stripped filter plate section is fitted with fresh filter media and used again it remelts and joins the filtered melt stream.

BRIEF DESCRIPTION OF THE DRAWINGS

FIG. 1 is a perspective view of a slide-plate filter with stripper means for removing used filter media and stiffened working material from the filter-plate exiting from the outlet port passageway;

FIG. 3 is an enlarged longitudinal sectional partial view showing details of the stripper knife and two sequential filter plate sections abutting each other endwise;

FIG. 5 is a partial view in perspective schematically showing a mode of feeding a filter medium to the slide plates at the input to the inlet port passageway;

DETAILED DESCRIPTION OF THE DRAWINGS

Figure 4:
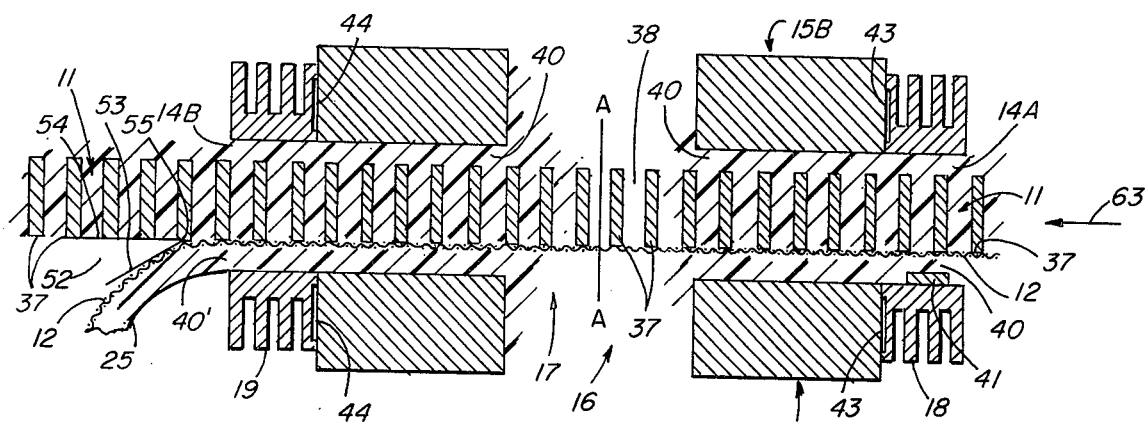
FIG. 4 is a partially-schematic section on line 4—4 of FIG. 1.

The filter device shown in FIGS. 1 to 4, inclusive, is primarily adapted for operation with a heat softening material such as a thermoplastic polymer or the like. This device has a rigid filter plate 11 on the upstream face 37 of a breaker portion 28 of which are carried filter screen media 12, upstream and downstream housing members 15A and 15B respectively, defining a fluid working material or melt-stream path 16, an upper guideway member 21, a lower guideway member 22, inlet heat exchange devices 18 and outlet heat exchange devices 19. The housing members 15A and 15B are attached to the upper and lower guideway members 21 and 22, respectively, by bolts 31, as shown; these members can be attached to each other by other means, such as welding, copper brazing or the like. The guideway members 21 and 22 are fixed between the housing members 15A and 15B, above and below the fluid working material path 16 so as to form inlet and outlet passageways 14A and 14B, respectively for the slide plate 11. The members 15A and 15B may be heated via heaters 45. Cooling means (not shown) may be provided, if desired.

The inlet and outlet passageways 14A and 14B which are illustrated have smooth walls and provide a conduit for the filter plate 11 which conduit is dimensionally larger in cross-section than the filter plate at both the inlet and outlet ends. The inlet heat exchange devices 18 are secured to the guideway members 21, 22 nearby the housing members 15A and 15B so as to provide with the guideway members a continuation elongating the inlet passageway. Similarly, the outlet heat exchange devices 19 are secured to the guideway members nearby the housing members so as to provide with the guideway members a continuation elongating the outlet passageway. As shown, the heat exchange devices 18 and 19 are heat radiators, capable of exchanging heat with surrounding air, and thereby cooling the respective passageway regions between them.

The filter plate 11 can be forced to move through the passageways 14A and 14B and to advance across the melt-stream path 16 by a pusher means 13 having a push rod 34 which in cooperation with a piston 13 makes contact with an end of the slide plate 11. The push rod 34 and piston 13' can be activated by hydraulic means such as a fixed or variable displacement pump or a pump driven by a variable speed electric motor or the push rod itself can be activated by mechanical means driven by an electric motor. A slide plate regulating system is described herein with reference to FIG. 7.

Figure 2:
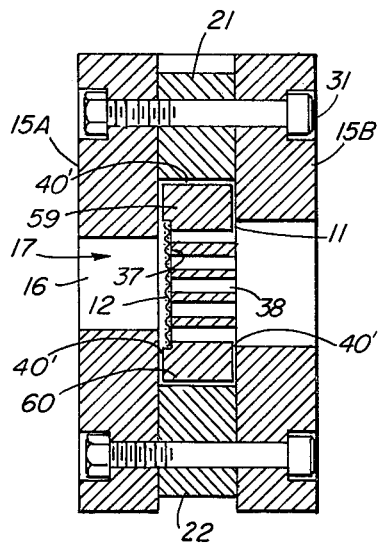
FIG. 2 is a section on line 2—2 in FIG. 1.

As is indicated in FIGS. 2 and 4, the filter plate 11 is smaller in cross-sectional size than the passageways through which it moves in its path transverse to the meltstream path 16. FIG. 2 illustrates a small gap 40' in the outlet passageway 14B, which may be in the range 0.001 inch to 0.004 inch thick, or larger. A similar gap 40 is formed in the inlet passageway 14A, between the filter plate 11 and the passageway walls (FIG. 4). In the operation of this filter, the fluid working material is caused to flow along the melt stream path 16 in the direction of arrow 17 (FIG. 2) to be filtered by the screen or filter media 12 carried by the filter plate 11 on the breaker portion 28, which is fitted with bores 38 so as to be permeable to the flow of the fluid working material. The filter plate 11 can be advanced by the pusher mechanism either continuously or incrementally across the path 16, the choice being made by the operator, depending on the extent to which it is desirable continuously to present clean screens or filter media to the melt stream. The filter plate advancing means may cooperate with sensing means (see FIG. 7) which detects pressure drop across the filter media 12 and activates the pusher means 13, as may be required to maintain a desired limit on the variation ($\Delta P$) of working pressure applied to the melt stream.

The working material being filtered is maintained in a fluid state in the melt stream 16, where it flows under the working pressure through the filter media 12, and through the bores 38. The working pressure also forces the fluid material toward the outside of the device through the inlet and outlet passageways 14A, 14B, where the working material becomes progressively cooler as it moves away from the melt stream path 16. In the case where the working material is a thermoplastic polymer, for example, it can be cooled to a substantially solid state within the heat exchangers 18 and 19, forming seals in the gaps 40, 40' (FIG. 4) surrounding the filter plate 11, between the filter plate and the inner walls of the inlet and outlet passageways 14A and 14B, respectively. In order to enhance the cooling capabilities of the heat exchange devices 18 and 19, thermal-isolation gaps 43 and 44 (FIG. 4) are provided between the heat exchange devices and the housing members. If desired, temperature controlled air (not shown) can be caused to flow along the surfaces of the fins of the heat exchange devices 18 and 19, in the direction of arrows 27, as shown in FIG. 1. The amount of cooling may be controlled by a temperature control plenum 24 (shown in FIG. 1) for the heat exchange devices 18 and 19, enclosing the surfaces of the fins of each heat exchange device 18 and 19, through which air or other coolant gas can be passed.

Each gap 40 and 40' is filled with cooled working material so that solidifying or substantially solidified working material may be in contact with the housing members 15A, 15B, guideway members 21, 22, and the heat exchange devices 18, 19, as well as the filter plate 11. The gaps 40 and 40' can be made sufficiently thin so that only a small quantity of the working material is used for sealing purposes. Typically, upstream the gaps may be from approximately 0.001 to 0.004 inch thick to one eighth of an inch or more, and downstream the gaps may be approximately 0.001 inch thick. The difference in the thicknesses of upstream and downstream sides of the gaps 40 and 40' is the result of fluid material flow in the melt stream path 16 forcing the filter plate 11 to move in the downstream direction, so that in use the downstream sides of the gaps will be thinner than the upstream sides, and in some cases the gaps at the downstream side of the filter plate may be virtually impassable to the fluid working material. The stiffened working material seal 25 that is formed in the gap 40' in the outlet passageway 14B passes out of the filter machine with the advancing filter plate 11, to be replaced by more hardening working material from the melt stream, as the filter is changed. A stop bar 41 can be placed across the up-stream side of the inlet port passageway 14A. Seal material from the inlet passageway 14A will, upon being advanced into the melt stream path 16, melt and join the filter melt, so that the only material lost from the filter machine is the seal material 25 attached for the most part to the upstream face 37 of the breaker portion 28 of the filter plate 11 emerging from the outlet passageway 14B. The seal material is there removed from the upstream face 37 by stripper means 51, so that a filter plate section 11 can be re-used, with new filter screen means 12 if desired. As FIG. 3 illustrates, a second slide plate section 11B can follow a first slide plate section 11A into the filter housing, so that a filtering process can be carried on continuously.

The stripper means 51 comprises a wedge-shaped rigid body 52 having first and second surfaces 53, 54, respectively, which meet at an acute angle in an edge 55. As is shown in detail in FIG. 3, a blade 67 is fastened to the first surface 53 under a backing plate 68 held to the body 52 with bolts 69. The blade has a knife edge 65 which is positioned to separate the seal material 25 with used screen media 12 embedded in it from the upstream surface 37 of the breaker portion 28 of the filter plate 11 as the latter advances out of the outlet passageway 14B. The second surface 54 of the wedge-shaped body 52 is preferably positioned substantially parallel and close to the upstream surface 37. The stripper body 52 may be heated, if desired, by a heater mechanism 56. The stripper body is mounted to the guideway members 21, 22, as by bolts (not shown) at its ends 57, 58, respectively. The slide plate 11 has longitudinal side rails 59, 60 on either side, respectively, of the breaker portion 28, and the upstream surface 37 of the breaker portion is recessed between these side rails. Filter media 12 are held on the upstream surface 37 between the side rails 59, 60. The upstream surface 37 extends longitudinally between the rails 59, 60, substantially uniformly and without interruption, so that the filter plate 11 can be advanced continually against the knife edge 65, which reaches between the rails 59, 60 to the upstream surface 37. The blade 67 needs to extend over only that portion of the body 52 which overlies the breaker portion 28, between the rails 59, 60.

Referring in particular to FIGS. 3 and 4, the slide plate 11 as used in practice is made in sequentially-employed sections, two of which 11A and 11B are illustrated in FIG. 3. The pusher mechanism 13 (not shown in FIGS. 3 and 4) forces the slide plate sections 11A, 11B, etc., to advance one after another into the inlet passageway 14A in the direction represented by arrows 63. The stripper means 51 exerts a force in the opposite direction, represented by an arrow 64 (FIG. 3), when the knife edge 65 digs into the solidified seal material 25 for separating the seal material from the filter plate 11 exiting the outlet passageway 14B. The filter plate sections 11A, 11B meet endwise, as represented by line A—A in FIGS. 3 and 4, without any means to interlock them. It is desirable in practicing the invention to maintain successive filter plate members close together at their confronting ends for continuous filter-changing operation in a manner such that fluid working material in the fluid path 16 does not force the filter plate sections apart and flow between them and thus bypass the filter means, or deprive the filter media 12 (if the latter is continuous) of the support of the breaker plate portion 28. The net opposing forces exerted by the pusher mechanism 13 and the stripper means 51 can be made sufficiently large to hold the slide plate sections 11A, 11B together in the melt stream path 16. The temperatures of one or both of the stripper means body 52 and the heat-exchange devices 18, 19 may be adjusted to a value or respective values at which the seal material 25 with used filter media 12 can be most easily removed from the slide plate 11 while maintaining sufficient braking force contributed by the stripper means to hold successive sections of the filter plate together in the melt stream.

When the knife edge 65 is advanced into the seal material 25, the blade 67 acts like a wedge under the filter media 12, and lifts the seal material 25 with filter media 12 away from the filter plate 11A, 11B, etc., tending thereby to pull some of the still-warm solidified working material out of the bores 38. As a result, the knife edge 65 cuts off round portions 38' that pulled out of the bores, and the seal material that is removed from the filter plates by the stripper means 51 may have round projections on it.

As is shown in FIG. 5, a length of filter medium 12 from a supply (e.g.: a roll) of filter screen material (not shown) can be supplied continuously to the apparatus as filter plate sections 11 are advanced one after another into the apparatus. The screen material is laid down on the upstream surface 37 of the breaker portion 28 between the rails 59, 60. FIGS. 1 and 5 show a direction-changing mechanism 70 for continuously supplying the screen material 12 to slide plate sections 11A, 11B, etc., as the same are successively advanced into the inlet port passageway 14A by the pusher mechanism 13. A roller 71 is journalled at its ends in bearing blocks 72, 73, which in turn are respectively mounted to the guideway members 21, 22. The screen material 12 passes around the roller 71, from the supply (not shown) to the slide plate 11. The roller surface is positioned sufficiently close to the upstream surface 37 of the breaker portion 28 to put the screen material down close to the upstream surface 37, between the rails 59, 60, so that as the breaker portion 28 advances into the melt stream passage 16 the fluid working material will force the screen material onto the up-stream surface 37. Thus, in practice, the filter media 12 may be continuously supplied to each of a series of succesive slide plate sections.

Figure 6:
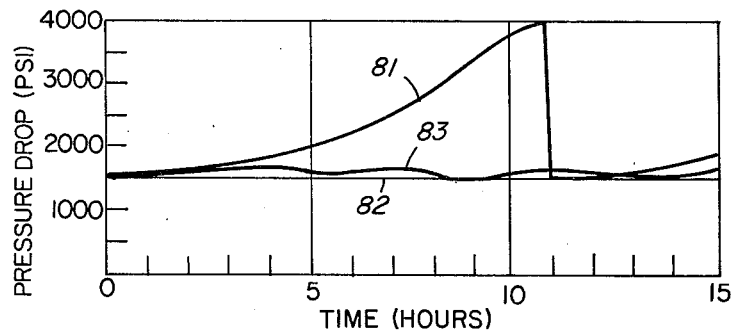
FIG. 6 is a graphical illustration of change in pressure drop with respect to time of residence of filter media in the melt stream, comparing the prior art with the present invention.

FIG. 6 illustrates the improved performance capability of filter apparatus incorporating filter media (e.g.: screen) changers according to the invention. Curve 81 represents the build-up of pressure (psi) across the filter medium of a typical prior art filter machine employing intermittent screen changing. A typical extrusion line might operate with a pressure drop of 1500 psi in the period immediately following the insertion of a clean filter by a slide plate screen changer. Line 82 represents the ideal situation wherein the pressure remains constant at 1500 psi. As time passes with the filter remaining in the melt stream collecting contaminants, the filter begins to blind, and the pressure increases, to (typically) 4000 psi, over some period of time varying from minutes to days depending upon the application, an example of 11 hours being shown in FIG. 6. Insertion of a new filter at that time causes an abrupt drop ($\Delta P$) in pressure across the filter medium to 1500 psi, causing irregularities in operation, as is discussed above. The present invention making possible continuous filter changing, or filter changing in small steps or increments, brings about the possibility to reduce the pressure variation $\Delta P$ to a small fraction of what has heretofore been tolerated, as is illustrated by curve 83. This can be done by manually presetting the change rate, or by installation of an automatic closed-loop filter-change regulating system, as is described in connection with FIG. 7.

Figure 7:
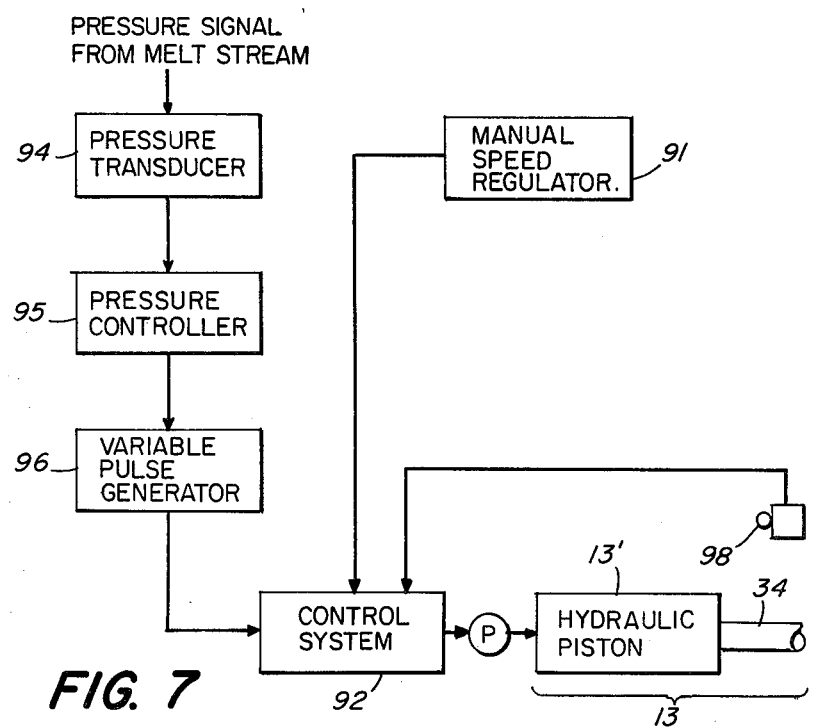
FIG. 7 is a schematic illustration of control means for advancing a filter medium across a melt stream.

FIG. 7 illustrates a regulating system which enables the filter apparatus to use a force generated outside the melt stream to change the filter media continuously or in increments of any desired size. Since in the invention the sealing means does not use surfaces that are tightly clamped together there is no requirement to overcome the relatively tremendous friction of one solid body sliding on another solid body to which it is tightly clamped. In the filter apparatus of the invention the outside force required to advance the filter plate 11 can be relatively small, and predictable. In the illustrated regulating system, the hydraulic piston 13' receives hydraulic fluid (e.g.: oil) from a pump P which is controlled from a control system 92. A manual speed regulator 91, comprising an interval timer which can be manually set to provide individual electrical pulses over a widely variable frequency range, feeds such pulses at a set frequency to the control system 92 which drives the pump P in proportion to the number of electrical pulses, in effect converting the electrical pulses to hydraulic pressure pulses, and these pressure pulses in turn are fed to the hydraulic piston 13'. A simple knob control at the manual speed regulator (not shown) increases or decreases the pulse rate and thereby varies the rate of advance of the filter plate 11 across the melt stream. For automatic regulation a pressure transducer 94, pressure controller 95, and variable pulse generator 96 are substituted for the manual speed regulator 91. An estimated frequency is set on the variable pulse generator 96 and the desired $\Delta P$ is set on the pressure controller 95. The true $\Delta P$ is read by the pressure transducer 94, which is designed to receive a pressure signal from the melt stream, and a signal from the pressure transducer is compared with the desired $\Delta P$ in the pressure controller 95. Any resulting deviation signal is transmitted to the variable pulse generator 96, and the pulse generator adjusts its frequency to reduce the deviation to zero. It is thus possible to establish a programmable variable pushing force for the filter plate.

When the push rod 34 reaches the end of its stroke, a limit switch 98 resets the regulating system via the control system 92. While a regulating system that is useful for taking advantage of the capabilities of the invention has been described, the modes of operation possible with filter apparatus according to the invention are a matter of choice of the user.

The invention provides readily reuseable filter plate sections 11A, 11B, etc., immediately following removal of seal material 25 and used filter media 12 by the stripper means 51. A filter plate section can be fitted with fresh filter media and re-inserted into the apparatus at the inlet passageway 14B whenever the push rod 34 is reset. Solidified filtered working material filling the holes 38 in the breaker portion 28, which remains after the solidified seal material and used filter media are stripped from the upstream surface 37, is remelted upon being reintroduced into the melt stream, and becomes a part of the filtered melt stream. There is no need to clean the plate sections of filtered working material before re-using them. Time, and energy, are both saved.

I claim:

1. In slide filter apparatus for filtering contaminants from a fluid working material flowing in a defined path, the working material having the property that it can stiffen in response to temperature change, the apparatus having rigid self-supporting filter plate means for carrying on an up-stream surface replaceable filter media means from an inlet port passageway across the path of fluid flow to an outlet port passageway, the cross section of the outlet port passageway being larger than the cross section of the filter plate means so as to form a gap into which fluid working material can escape from said path, and temperature control means to form a seal of stiffened working material binding said filter media means to said filter plate means in the gap, the improvement comprising means to brake and strip said filter plate means provided at a predetermined positioning outside the exit end of said outlet port passageway for separating said filter media means together with the stiffened working material and contaminants collected therein from said upstream surface of the filter plate means exiting from said outlet port passageway, and means at said inlet port passageway to force said filter plate means into said inlet port passageway and through said passageways against said stripper means, said predetermined positioning providing a filter plate means sufficiently clean so that it can be reused without requiring treatment to remove spent filter media and collected contaminants from it after said filter plate means is passed by said means to brake and strip said filter plate means.

2. Apparatus according to claim 1 including means to heat said stripper means for supplying a controllable retarding force outside said exit end.

3. Apparatus according to claim 1 in which the stripper means includes a rigid body supporting means positioned closely adjacent said up-stream surface for separating said filter media means from said up-stream surface together with the stiffened working material.

4. Apparatus according to claim 3 including means to heat said body.

5. Apparatus according to claim 3 including separable blade means attached to said body.

6. Apparatus according to claim 1 in which the slide plate means comprises elongated plate means having longitudinal edge-wise rail portions with breaker-plate means extending longitudinally between said rail portions and having said up-stream surface recessed between said rail portions substantially uniformly and without interruption, said filter media means being carried on said recessed up-stream surface.

7. Apparatus according to claim 6 including means to locate said filter media means between said rail portions.

8. Apparatus according to claim 7 including means adjacent said inlet port passageway to push said elongated plate means across said path of fluid flow, and means adjacent said inlet port passageway for supplying filter media means on said upstream surface between said rail portions while said plate means is advancing into said inlet port passageway.

9. Apparatus according to claim 8 including means to measure the pressure in said fluid flow on the up-stream side of said filter plate, and means responsive to said measuring means to regulate said control means so as to hold to a minimum the variation in pressure drop across said filter media due to contaminants collected from the working material during use of the apparatus.

10. Apparatus according to claim 6 in which the stripper means includes a rigid body supporting between said rail portions closely adjacent said up-stream surface means for separating said filter media means from said upstream surface together with the stiffened working material and for removing the same from between said rail portions.

11. Apparatus according to claim 10 wherein said body of said stripper means includes support means extending over said rail portions for holding said separating means positioned between said rail portions.

12. Apparatus according to claim 11 including guide means adjacent each longitudinal edge of said elongated plate means for guiding said plate means away from said outlet port passageway between said guide means, said support means for said stripper means being mounted to said guide means.

13. Apparatus according to claim 10 wherein said separating means comprises blade means attached to said rigid body and having knife-edge means extending to said up-stream surface between said rail portions.

14. Apparatus according to claim 1 including force means adjacent said inlet port to push said filter plate means across said path of fluid flow, and control means to apply pulses of energy substantially continually to said force means for applying pulses of force to push said plate means in incremental steps of controlled size.

* * * * *